(12) United States Patent
Soriaga et al.

(10) Patent No.: US 10,389,504 B2
(45) Date of Patent: *Aug. 20, 2019

(54) RECIPROCAL CHANNEL SOUNDING REFERENCE SIGNAL ALLOCATION AND CONFIGURATION

(71) Applicant: QUALCOMM Incorporated, San Diego, CA (US)

(72) Inventors: Joseph Binamira Soriaga, San Diego, CA (US); Jing Jiang, San Diego, CA (US); Krishna Kiran Mukkavilli, San Diego, CA (US); Naga Bhushan, San Diego, CA (US); Tingfang Ji, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,731

(22) Filed: Aug. 31, 2018

(65) Prior Publication Data

US 2019/0020457 A1 Jan. 17, 2019

Related U.S. Application Data

(63) Continuation of application No. 14/866,803, filed on Sep. 25, 2015, now Pat. No. 10,075,271.

(Continued)

(51) Int. Cl.
*H04L 5/00* (2006.01)
*H04L 25/02* (2006.01)
(Continued)

(52) U.S. Cl.
CPC ......... *H04L 5/0048* (2013.01); *H04B 7/0617* (2013.01); *H04L 5/0051* (2013.01);
(Continued)

(58) Field of Classification Search
CPC ... H04B 7/0452; H04B 7/0617; H04L 5/0048; H04L 5/0051; H04L 25/0222; H04L 25/0398; H04W 72/044; H04W 72/0446
See application file for complete search history.

(56) References Cited

U.S. PATENT DOCUMENTS

| 2009/0034468 A1 | 2/2009 | Muharemovic et al. |
| 2009/0093222 A1 | 4/2009 | Sarkar |

(Continued)

FOREIGN PATENT DOCUMENTS

| EP | 2634939 A2 | 9/2013 |
| WO | WO-2011099906 A1 | 8/2011 |

OTHER PUBLICATIONS

Freescale Semiconductor: "Uplink Channel Sounding Issues", 3GPP Draft, R1-073146 Soundingrs, 3rd Generation Partnership Project (3GPP), Mobile Competence Centre, 650, Route Des Lucioles, F-06921 Sophia-Antipolis Cedex, France, vol. RAN WG1, no. Orlando, USA, 20070620, Jun. 20, 2007 (Jun. 20, 2007), XP050106788, pp. 1-5, [retrieved on Jun. 20, 2007] the whole document.

(Continued)

*Primary Examiner* — Paul H Masur
(74) *Attorney, Agent, or Firm* — Linda G. Gunderson; Haynes and Boone, LLP

(57) ABSTRACT

Systems and techniques are disclosed to enhance the efficiency of available bandwidth between UEs and base stations. A UE transmits a sounding reference signal to the base station, which characterizes the uplink channel based on the SRS received and, using reciprocity, applies the channel characterization for the downlink channel. The base station may form the beam to the UE based on the uplink channel information obtained from the SRS. As the downlink channel changes the base station needs updated information to maintain its beamforming, meaning it needs a new SRS. Transmission of the SRS takes resources; to minimize this, (Continued)

the UE or the base station can determine a period during which the downlink channel will predictably remain coherent and set up a schedule for sending SRS. Alternatively, the UE or the base station can determine on demand that the channel is losing coherence and initiate an on demand SRS.

32 Claims, 12 Drawing Sheets

Related U.S. Application Data

(60) Provisional application No. 62/133,328, filed on Mar. 14, 2015.

(51) Int. Cl.
*H04W 72/04* (2009.01)
*H04L 25/03* (2006.01)
*H04B 7/06* (2006.01)
*H04B 7/0452* (2017.01)

(52) U.S. Cl.
CPC ...... *H04L 25/0222* (2013.01); *H04L 25/0398* (2013.01); *H04W 72/0446* (2013.01); *H04B 7/0452* (2013.01)

(56) References Cited

U.S. PATENT DOCUMENTS

| | | |
|---|---|---|
| 2009/0109908 A1 | 4/2009 | Bertrand et al. |
| 2009/0129312 A1 | 5/2009 | Jia et al. |
| 2009/0181687 A1 | 7/2009 | Tiirola et al. |
| 2011/0275335 A1 | 11/2011 | Luo et al. |
| 2011/0280220 A1 | 11/2011 | Jia et al. |
| 2012/0005548 A1 | 1/2012 | Rao |
| 2012/0106489 A1 | 5/2012 | Konishi et al. |
| 2013/0028229 A1 | 1/2013 | Suh et al. |
| 2013/0044610 A1 | 2/2013 | Zhao et al. |
| 2013/0078913 A1 | 3/2013 | Lee et al. |
| 2013/0100896 A1 | 4/2013 | Chen et al. |
| 2013/0322280 A1 | 12/2013 | Pi |
| 2014/0036809 A1 | 2/2014 | Xu et al. |
| 2014/0112168 A1 | 4/2014 | Chen et al. |
| 2014/0119302 A1 | 5/2014 | Ahn et al. |
| 2014/0169310 A1 | 6/2014 | Ma et al. |
| 2014/0376482 A1 | 12/2014 | Kim et al. |
| 2015/0009951 A1 | 1/2015 | Josiam et al. |
| 2015/0078186 A1 | 3/2015 | Lagen et al. |
| 2015/0381246 A1 | 12/2015 | Huang et al. |
| 2016/0269158 A1 | 9/2016 | Soriaga |
| 2016/0269159 A1 | 9/2016 | Soriaga et al. |

OTHER PUBLICATIONS

International Search Report and Written Opinion—PCT/US2016/016734—ISA/EPO—Apr. 29, 2016.
Second Written Opinion from International Application No. PCT/US2016/016734, dated Feb. 27, 2017, 11 pp.
Research in Motion, et al., "Design and Configuration Considerations on Aperiodic SRS for LTE-A," 3GPP Draft; R1-102054 (Consideration Aperiodic SRS for LTE-A), 3rd Generation Partnership Project (3GPP), Mobile Competence Centre; 650, Route Des Lucioles; F-06921 Sophia-Antipolis Cedex; France, vol. RAN WG1, no. Beijing, China; 20100412, Apr. 6, 2010, XP050419384.
Sharp: "Remaining Issues on Dynamic Aperiodic SRS Signaling," 3GPP Draft; R1-110278, 3rd Generation Partnership Project (3GPP), Mobile Competence Centre; 650, Route Des Lucioles; F-06921 Sophia-Antipolis Cedex; France, vol. RAN WG1, No. Dublin, Ireland; 20110117, Jan. 11, 2011, XP050490171.

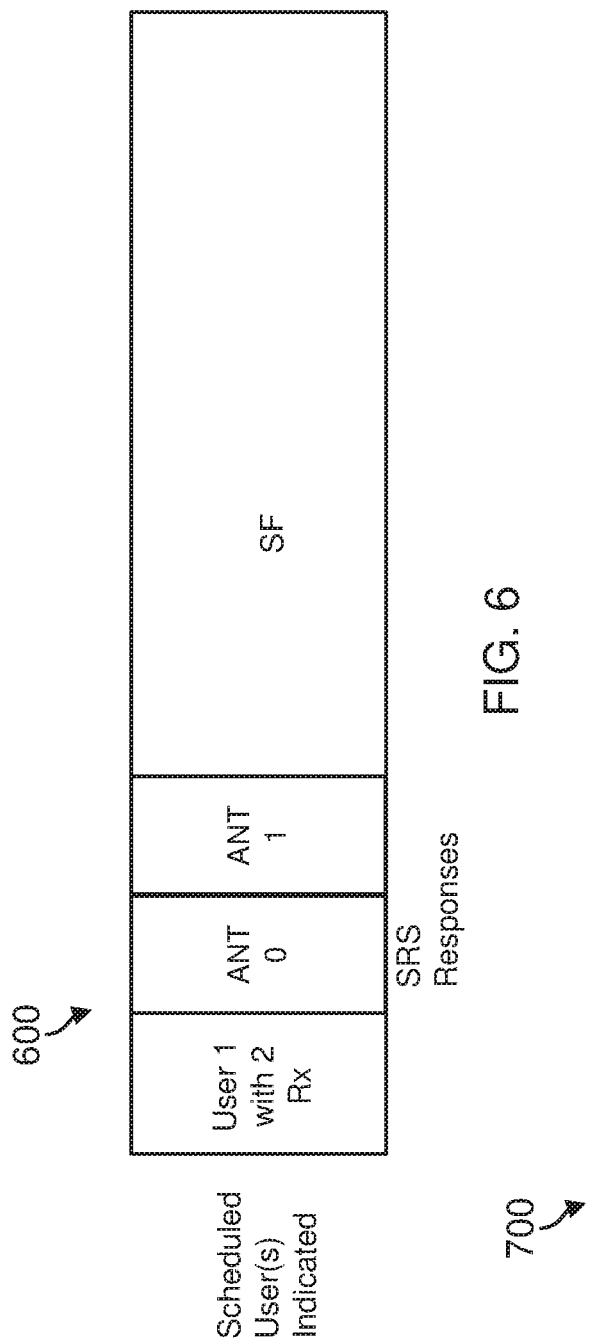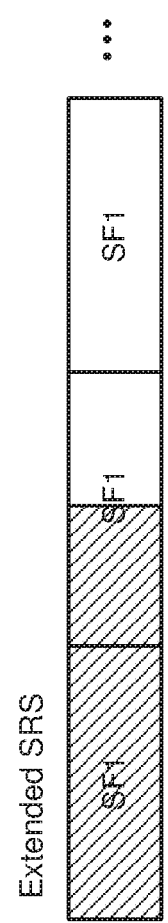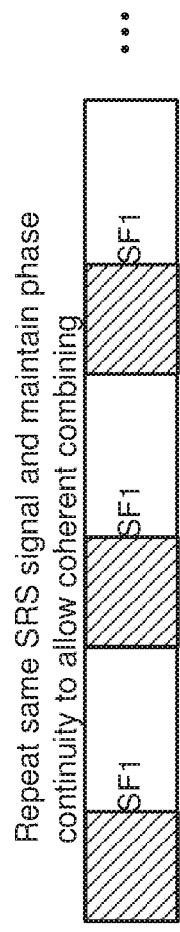
FIG. 6
FIG. 7
FIG. 8

RECIPROCAL CHANNEL SOUNDING REFERENCE SIGNAL ALLOCATION AND CONFIGURATION

CROSS REFERENCE TO RELATED APPLICATIONS

The present application is a continuation application of U.S. Non-Provisional patent application Ser. No. 14/866,803, filed Sep. 25, 2015, which claims priority to and the benefit of the U.S. Provisional Patent Application No. 62/133,328, filed Mar. 14, 2015, the disclosure of each of which is hereby incorporated by reference in its entirety.

TECHNICAL FIELD

This application relates to wireless communication systems, and more particularly to using channel state information obtained from an uplink sounding signal in non-orthogonal or orthogonal applications to beamform downlink messages to targeted recipients.

BACKGROUND

A wireless communication network may include a number of base stations that can support communication for a number of user equipments (UEs). In recent years, the carrier frequencies at which base stations and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G, or 4G), however, more beam forming gain (and more accurate) is becoming necessary.

Further, conventional systems employ various types of reference signals, with varying fixed structures, to provide sufficient measurements and estimations for adaptive multi-antenna operation in uplink and/or downlink directions. For example, a channel state information reference signal (CSI-RS) may be used on a downlink from the base station to aid the base station in beam form determination, an uplink demodulation reference signal (DM-RS) specific to each UE may be used to estimate channel information for the uplink specifically, and each UE may use a sounding reference signal (SRS) on the uplink to aid in scheduling (e.g., determining which frequency bands are good or bad for data). There is no single signal that is able to achieve all of above functionality for UEs.

Reciprocity describes the ability for a station to use information (such as a multipath delay profile) from one channel (e.g., the uplink) in making determinations regarding another channel (e.g., the downlink). Reciprocity has not been available for cellular networks because current approaches require reference signals specific for particular antennas, such as CSI-RS in the long term evolution (LTE) context. Further, CSI-RS and other types of signals do not scale well, which is becoming an ever-increasing issue as the demand for mobile broadband continues to increase.

SUMMARY

In one aspect of the disclosure, a method for communicating with a base station includes determining, at a user equipment (UE), channel correlation information for a channel between the UE and the base station; defining, at the UE, a periodicity of transmission for a sounding reference signal (SRS) based on the channel correlation information; and transmitting, from the UE, the SRS in accordance with the defined periodicity.

In an additional aspect of the disclosure, a method includes determining, at a base station, channel correlation information for a channel between the BS and a user equipment (UE); transmitting, from the base station, a request for a sounding reference signal (SRS) from the UE based on the determined channel correlation information; receiving, at the base station, the requested SRS; and training, at the base station, beamforming to the UE based on the received SRS.

In an additional aspect of the disclosure, a method includes transmitting, from a base station, a request for a sounding reference signal (SRS) from a user equipment (UE), wherein the request for the SRS includes configuration information about the SRS; and receiving, at the base station, an SRS from the UE.

In an additional aspect of the disclosure, a method of communicating with a base station includes receiving, at a user equipment (UE), a request for a sounding reference signal (SRS) from the base station, wherein the request for the SRS includes configuration information about the SRS; and transmitting, from the UE, an SRS based on the received SRS configuration information to the base station.

In an additional aspect of the disclosure, a method of communicating with a base station includes determining, at a user equipment (UE), a processing gain (PG) to communicate with the base station; determining, at the UE, a minimum length of a sounding reference signal (SRS) based on the determined PG; and broadcasting, from the UE, an SRS having at least the minimum length to the base station.

In an additional aspect of the disclosure, a method of communicating with a wireless network includes determining, at a base station, a processing gain (PG) to communicate with a user equipment (UE); determining, at the base station, a minimum length of a sounding reference signal (SRS) based on the determined PG; and transmitting, from the base station, a request to the UE for an SRS having at least the minimum length.

In an additional aspect of the disclosure, a user equipment includes a processor configured to determine channel correlation information for a channel between the UE and a base station and define a periodicity of transmission for a sounding reference signal (SRS) based on the channel correlation information; and a transceiver configured to transmit the SRS in accordance with the defined periodicity.

In an additional aspect of the disclosure, a base station includes a processor configured to determine channel correlation information for a channel between the BS and a user equipment (UE); and a transceiver configured to transmit a request for a sounding reference signal (SRS) from the UE based on the determined channel correlation information and receive the requested SRS, wherein the processor is further configured to: beamform to the UE based on the received SRS.

In an additional aspect of the disclosure, a base station includes a processor configured to generate a request for a sounding reference signal (SRS) from a user equipment (UE), wherein the request for the SRS includes configuration information about the SRS; and a transceiver configured to transmit the request and receive an SRS from the UE in response to the request.

In an additional aspect of the disclosure, a user equipment (UE) includes a transceiver configured to receive, from a base station, a request for a sounding reference signal (SRS), wherein the request for the SRS includes configuration information about the SRS; and a processor configured to generate the SRS based on the received SRS configuration information, wherein the transceiver is further configured to transmit the generated SRS to the base station.

In an additional aspect of the disclosure, a user equipment includes a processor configured to determine a processing gain (PG) to communicate with a base station and a minimum length of a sounding reference signal (SRS) based on the determined PG; and a transceiver configured to broadcast an SRS having at least the minimum length to the base station.

In an additional aspect of the disclosure, a base station includes a processor configured to determine a processing gain (PG) to communicate with a user equipment (UE) and a minimum length of a sounding reference signal (SRS) based on the determined PG; and a transceiver configured to transmit a request to the UE for an SRS having at least the minimum length.

In an additional aspect of the disclosure, a computer-readable medium having program code recorded thereon includes program code comprising code for causing a user equipment (UE) to determine channel correlation information for a channel between the UE and a base station; code for causing the UE to define a periodicity of transmission for a sounding reference signal (SRS) based on the channel correlation information; and code for causing the UE to transmit the SRS in accordance with the defined periodicity.

In an additional aspect of the disclosure, a computer-readable medium having program code recorded thereon includes program code comprising code for causing a base station to determine channel correlation information for a channel between the base station and a user equipment (UE); code for causing the base station to transmit a request for a sounding reference signal (SRS) from the UE based on the determined channel correlation information; code for causing the base station to receive the requested SRS; and code for causing the base station to beamform to the UE based on the received SRS.

In an additional aspect of the disclosure, a computer-readable medium having program code recorded thereon includes program code comprising code for causing a base station to transmit a request for a sounding reference signal (SRS) from a user equipment (UE), wherein the request for the SRS includes configuration information about the SRS; and code for causing the base station to receive an SRS from the UE.

In an additional aspect of the disclosure, a computer-readable medium having program code recorded thereon includes program code comprising code for causing a user equipment (UE) to receive a request for a sounding reference signal (SRS) from the base station, wherein the request for the SRS includes configuration information about the SRS; and code for causing the UE to transmit an SRS based on the received SRS configuration information to the base station.

In an additional aspect of the disclosure, a computer-readable medium having program code recorded thereon includes program code comprising code for causing a user equipment (UE) to determine a processing gain (PG) to communicate with a base station; code for causing the UE to determine a minimum length of a sounding reference signal (SRS) based on the determined PG; and code for causing the UE to broadcast an SRS having at least the minimum length to the base station.

In an additional aspect of the disclosure, a computer-readable medium having program code recorded thereon includes program code comprising code for causing a base station to determine a processing gain (PG) to communicate with a user equipment (UE); code for causing the base station to determine a minimum length of a sounding reference signal (SRS) based on the determined PG; and code for causing the base station to transmit a request to the UE for an SRS having at least the minimum length.

In an additional aspect of the disclosure, a user equipment (UE) includes means for determining channel correlation information for a channel between the UE and a base station; means for defining a periodicity of transmission for a sounding reference signal (SRS) based on the channel correlation information; and means for transmitting the SRS in accordance with the defined periodicity.

In an additional aspect of the disclosure, a base station includes means for determining channel correlation information for a channel between the base station and a user equipment (UE); means for transmitting a request for a sounding reference signal (SRS) from the UE based on the determined channel correlation information; means for receiving the requested SRS; and means for training beamforming to the UE based on the received SRS.

In an additional aspect of the disclosure, a base station includes means for transmitting a request for a sounding reference signal (SRS) from a user equipment (UE), wherein the request for the SRS includes configuration information about the SRS; and means for receiving an SRS from the UE.

In an additional aspect of the disclosure, a user equipment (UE) includes means for receiving a request for a sounding reference signal (SRS) from a base station, wherein the request for the SRS includes configuration information about the SRS; and means for transmitting an SRS based on the received SRS configuration information to the base station.

In an additional aspect of the disclosure, a user equipment (UE) includes means for determining a processing gain (PG) to communicate with a base station; means for determining a minimum length of a sounding reference signal (SRS) based on the determined PG; and means for broadcasting an SRS having at least the minimum length to the base station.

In an additional aspect of the disclosure, a base station includes means for determining a processing gain (PG) to communicate with a user equipment (UE); means for determining a minimum length of a sounding reference signal (SRS) based on the determined PG; and means for transmitting a request to the UE for an SRS having at least the minimum length.

BRIEF DESCRIPTION OF THE DRAWINGS

FIG. 4 illustrates an exemplary frame structure for a synchronous subframe system with periodic channel decorrelation.

FIG. 5 illustrates an exemplary frame structure for a synchronous subframe system with random channel decorrelation.

FIG. 6 illustrates an exemplary subframe structure for multiplexed SRS from a multi-antenna user equipment.

FIG. 7 illustrates an exemplary frame structure for an extended length SRS in a low-interference environment.

FIG. 8 illustrates an exemplary frame structure for an extended length SRS in a high-interference environment.

DETAILED DESCRIPTION

Figure 1:
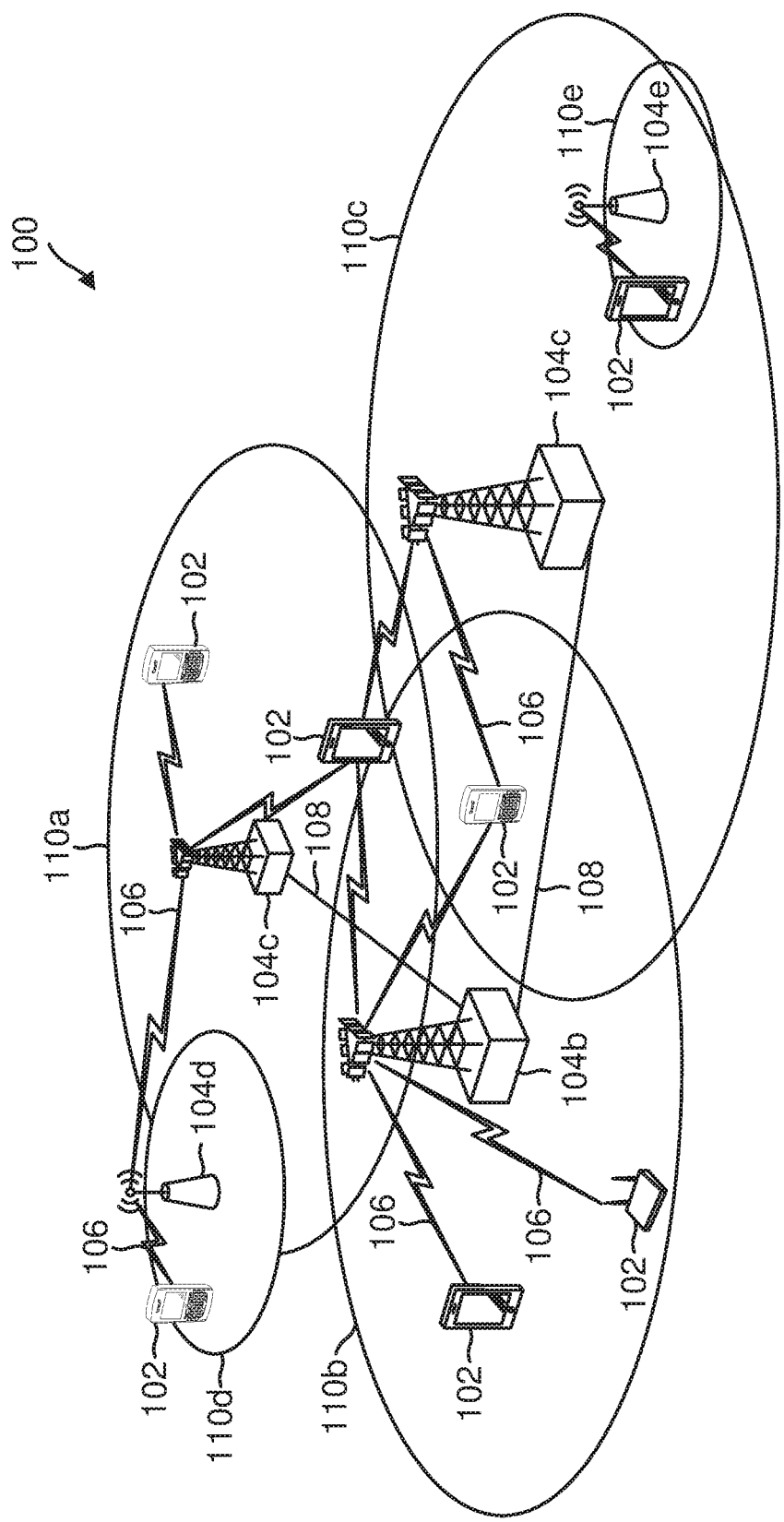
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to enhance the efficiency of use of available bandwidth in wireless communications channels between UEs 102 and wireless base stations 104. In an embodiment, multiplexing may be used to aid in increasing the efficiency of use of channel resources, such as frequency division multiple access (FDMA), time division multiple access (TDMA), code division multiple access (CDMA), or spatial division multiple access (SDMA). One way of achieving SDMA, or space division multiplexing, is by use of beamforming. If a device has multiple antennas, it may transmit signals from all antennas at once while altering the phase of the signal from each antenna to produce constructive and destructive interference. The interference may be calibrated to produce constructive interference in a specific direction and destructive interference in all other directions, thus essentially transmitting a "beam" of information that does not create interference in any other spatial area. Multiple beams may therefore be transmitted at once in different directions without interference. In order to successfully beamform, the multiple antenna device uses information about the channel between itself and its intended recipient device to create a beam which will reach the recipient.

Thus, according to embodiments of the present disclosure, a base station may harness channel reciprocity in order to use channel information obtained from the uplink channel from a UE to the base station for the downlink. A UE may transmit a sounding reference signal (SRS) to the base station, and the base station, in turn, may characterize the uplink channel based on the SRS received and, using reciprocity, apply the same channel characterization for the downlink channel back to the UE. As part of applying the channel information to the downlink, the base station may form the beam to the UE based on the uplink channel information obtained from the SRS. However, as the downlink channel changes the base station needs updated information to maintain its beamforming, which means it needs a new SRS. Transmission of the SRS takes resources, and it is desirable to minimize the amount of SRS sent. In some embodiments it is possible for the UE or the base station to determine a period during which the downlink channel will predictably remain coherent, and thus set up a periodic schedule for sending SRS for the base station retrain its beamforming. In other embodiments it is possible for the UE or the base station to determine on demand that the channel is losing coherence, and thus initiate an on demand SRS to retrain beamforming at the base station.

In some embodiments of the present disclosure, the UE or base station may determine that channel conditions are poor. In this case, an elongated SRS may be necessary to fully characterize the uplink channel. In some embodiments the UE may send an elongated SRS in one continuous burst, while in other embodiments the UE may fragment the SRS and send it in multiple bursts so as to avoid interfering with other communications.

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB). A base station may also be referred to as a base transceiver station, a node B, or an access point. A base station 104 may be a station that communicates with the UEs 102 and may also be referred to as a base station, a node B, an access point, and the like.

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. A base station for a femto cell may be referred to as a femto base station or a home base station.

In the example shown in FIG. 1, the base stations 104a, 104b and 104c are examples of macro base stations for the coverage areas 110a, 110b and 110c, respectively. The base stations 104d and 104e are examples of pico and/or femto base stations for the coverage areas 110d and 110e, respectively. As will be recognized, a base station 104 may support one or multiple (e.g., two, three, four, and the like) cells.

The wireless network 100 may also include relay stations. A relay station is a station that receives a transmission of data and/or other information from an upstream station (e.g., a base station, a UE, or the like) and sends a transmission of the data and/or other information to a downstream station (e.g., another UE, another base station, or the like). A relay station may also be a UE that relays transmissions for other UEs. A relay station may also be referred to as a relay base station, a relay UE, a relay, and the like.

The wireless network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
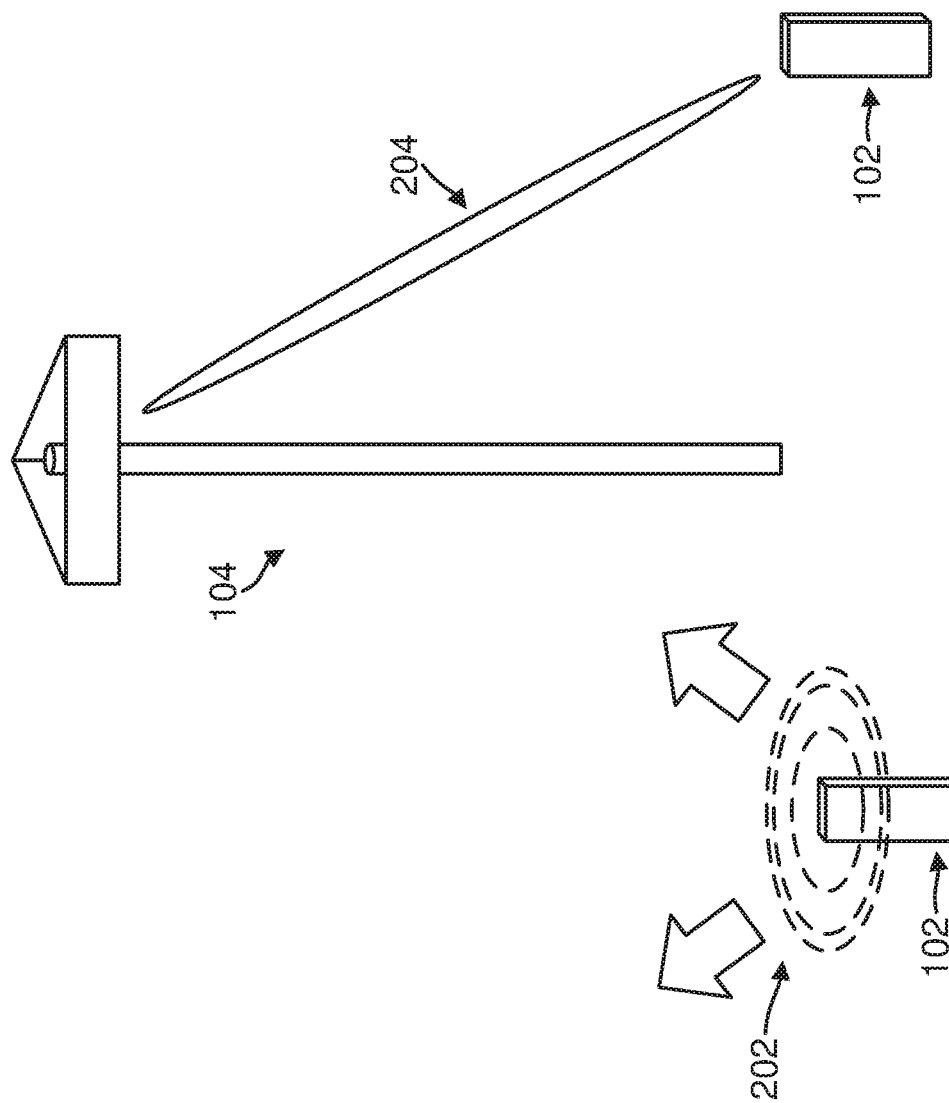
FIG. 2 illustrates a wireless communication network which uses sounding reference signals to enable beamforming at a base station.

Referring now to FIG. 2, there is shown an example of a system that may be used to enhance the efficiency of use of available bandwidth in wireless communications channels between one or more UEs 102 and one or more base stations 104, as discussed above with respect to FIG. 1. FIG. 2 illustrates one base station 104 and one UE 102 for purposes of simplicity of discussion, though it will be recognized that embodiments of the present disclosure may scale to many more UEs 102 and/or base stations 104. The UE 102 and the base station 104 may communication with each other at various frequencies. For example, in one embodiment the UE 102 and the base station 104 may communicate at sub-6 GHz frequencies, while in another embodiment at above 6 GHz frequencies, to name just two examples.

UE 102 broadcasts a sounding reference signal (SRS) 202 that is received by base station 104. In an embodiment, the SRS 202 may be an omni-directional transmission, while in another embodiment the SRS 202 may be a wide-beam transmission. Upon receipt of the SRS 202, the base station 104 is able to gather from the SRS 202, either explicitly or implicitly, channel information for the uplink channel between the UE 102 and the base station 104. The base station 104 may then use that uplink channel information to train its antennas to beamform a downlink 204 to the same UE 102.

Figure 3:
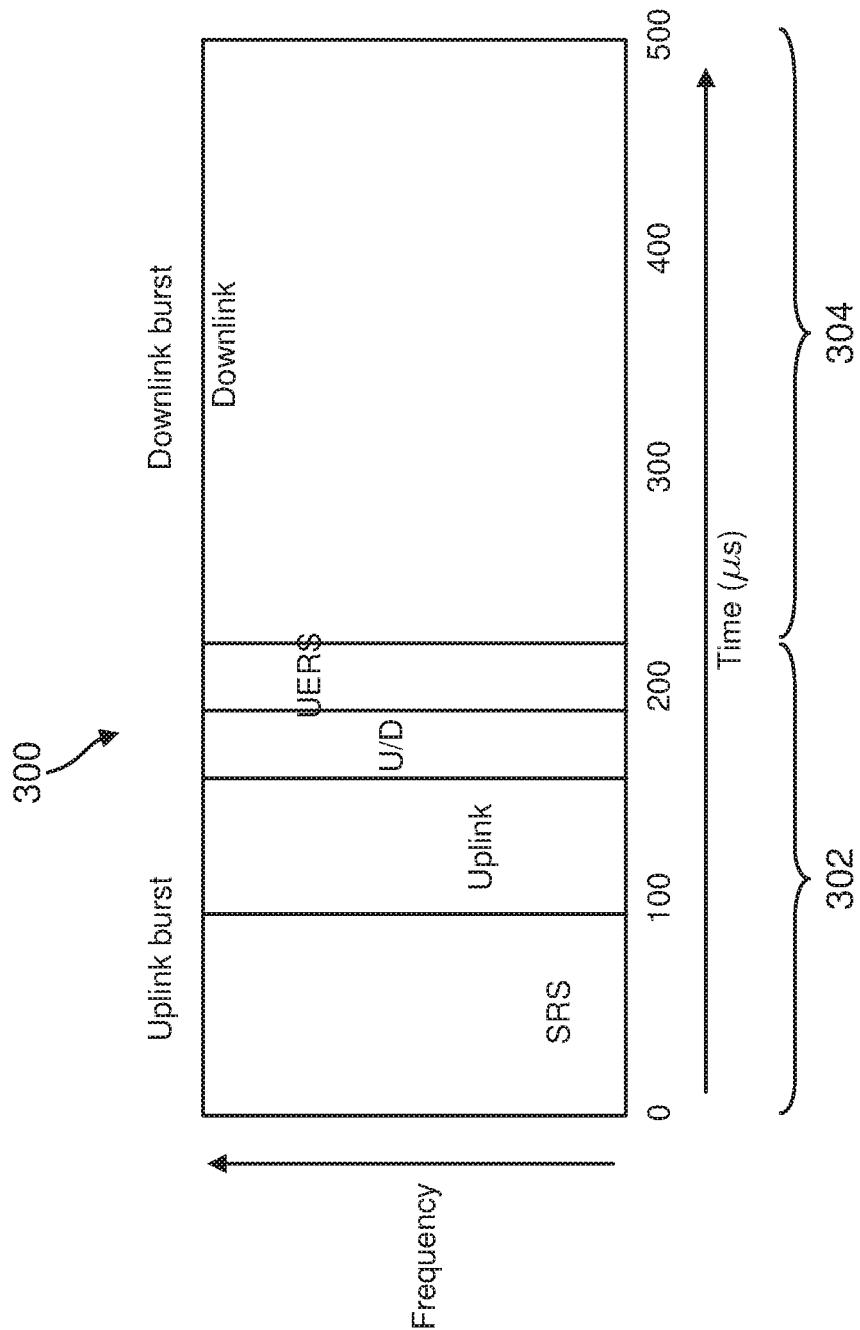
FIG. 3 illustrates an exemplary subframe structure.

To derive the most advantage from reciprocity (applying channel information obtained from the SRS 202 in the uplink), the base station 104 may rapidly re-apply that information (by training) for beamforming (or focusing) a downlink transmission to the UE 102 so as to minimize the effects of channel decorrelation. To assist in the rapid-reapplication of the channel information in the downlink, embodiments of the present disclosure utilize a short subframe structure. Referring now to FIG. 3, an exemplary subframe structure 300 is illustrated that operates within a short timeframe so as to minimize the effects of decorrelation in the channel. In an embodiment, the short timeframe may be approximately 500 microseconds, though it may also be shorter or longer than that. The short timeframe allows the base station 104 to essentially "freeze" the channel state for the duration of the subframe, during which the base station 104 may train and form the beam for the downlink and then provide a downlink burst.

Communications between UE 102 and base station 104 can be divided in the time domain into subframes (SFs) 300, such as the SF 300 illustrated in FIG. 3. A single subframe is illustrated in FIG. 3 for ease of illustration; as will be recognized, the structure of the SF 300 is scalable to any number of subframes as necessary or desired. Each SF 300 is divided into an uplink (UL) portion 302 and a downlink (DL) portion 304, separated by a transition portion U/D. As part of the UL portion 302, the UE 102 may send various types of signals to the base station 104. These may include, for example, an SRS (used here for transmit beamforming at the base station and in place of the uplink DMRS), uplink data, and optionally requests for information. The transition portion U/D is provided between the UL portion 302 and the DL portion 304. During the DL portion, the base station 104 sends various types of signals to the UE 102, including for example a user-equipment reference signal (UERS) and downlink data (e.g., in a downlink burst).

In some embodiments, the base station 104 may use the SRS in the UL portion 302 derive multiple pieces of information that facilitate the downlink between the UE 102 and the base station 104. For example, based on the SRS the base station 104 having multiple antennas is able to train its antennas to beamform the DL data transmitted back to the UE 102 so that, for instance, interference with other wireless communication devices in the range of the base station 104 is reduced. Beamforming relies on information about the channel between the UE 102 and the base station 104 that the base station 104 derives from the uplink SRS and then applies to the downlink based on reciprocity. The base station 104 can retrain its antennas as the channel changes over time (e.g., periodically or randomly), for example according to subsequent SRS received from the UE 102. This may happen, for example, if the UE 102 is moving or if other moving objects enter or leave the area/interfere with the uplink (or downlink) channel. According to embodiments of the present disclosure, the subframe 300 is provided as part of a synchronous system, such that the subframe 300 is provided repeatedly over time so that the base station 104 may retrain the beams to accommodate for UE 102 motion and channel decorrelation related to that movement (and/or other influences).

Channel reciprocity may allow the base station 104 to apply information about the channel in the UL direction to estimate one or more channel properties in the DL direction, which can be used to beamform the DL transmissions. In this manner, the base station 104 can train its antennas based on the SRS from the UE 102. The SRS may further include information that allows the base station 104 to demodulate data received from the UE 102 during the UL portion of the SF 300. The base station 104 may additionally determine, from the SRS, scheduling information that allows the base station 104 to schedule future SFs 300 (e.g., frequency bands, etc.) for communicating with the UE 102.

Figures 4, 5:
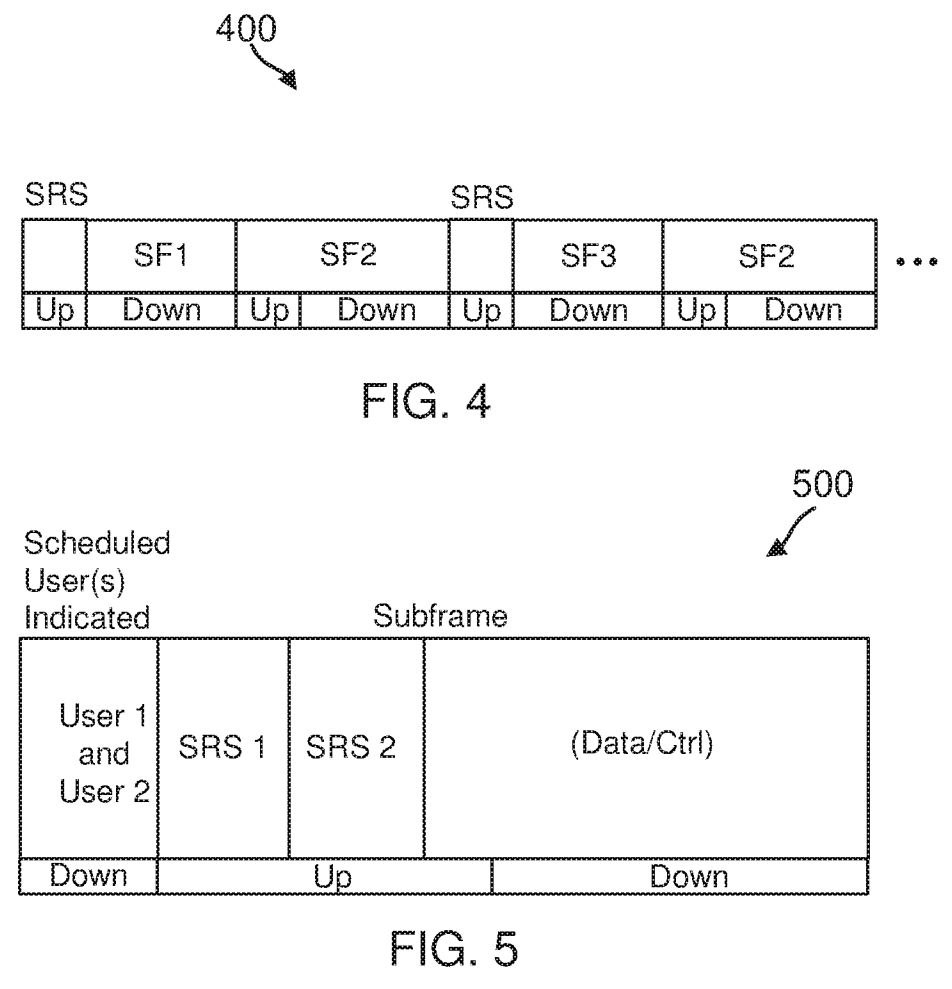

In some embodiments, a synchronous SF system allows for interference management by allocating how often SRSs are sent by the UE 102. Referring now to FIG. 4, an embodiment is shown in which the channel between the UE 102 and the base station 104 may be changing slowly, such as when the UE 102 is relatively stationary. In this case, the UE 102 or the base station 104 may determine that the base station's 104 current antenna beamforming will allow for acceptable communications for x number of SFs 300 before it needs to be retrained. For example, this period may be every two SFs (as illustrated by frame structure 400), every three, every four, or more SFs to name just a few examples. In this case, the base station 104 may instruct the UE 102, or the UE 102 may determine for itself, to only allocate a portion of the UL for an SRS once every x number of SFs. This allows the base station 104 to retrain its beamforming only when necessary to maintain the channel at an acceptable quality level. In other instances, the SRS can be sent every SF (e.g., even when the channel is changing slowly).

Referring now to FIG. 5, another embodiment of a synchronous SF system is shown in which the base station 104 may have a schedule for communicating with multiple UEs 102 during designated SFs. In an embodiment, the base station 104 may determine that it only needs to retrain its antenna beamforming for a particular UE 102 occasionally. For example, as illustrated in FIG. 5, there may be two UEs 102 scheduled to communicate during one SF 500 (corresponding to user 1 and user 2, respectively, and SRS 1 and SRS 2, respectively). When the SF 500 arrives during which the base station 104 is scheduled to communicate with the first and second UEs 102, the base station 104 allocates a first UL portion of the SF 500 to an SRS from the first UE 102 (e.g., SRS 1) and a second UL portion of the SF 500 to an SRS from the second UE 102 (e.g., SRS 2). The first and second UEs 102 send first and second SRSs, respectively, in response. This allows the base station 104 to train its antenna beamforming to compensate for the DL channels to each UE 102 as they then exist. The requests for SRSs are made during a DL portion of the SF 500 inserted at the beginning of the SF 500, illustrated in FIG. 5 as existing prior to the UL portion of the SF 500.

In some embodiments, multiplexing may be used to allow the base station 104 to communicate with multiple UEs 102 during the DL portion of one SF. One advantage of beamforming is that it allows the base station 104 to make use of space division multiplexing alongside other types of multiplexing such as frequency division multiplexing and code division multiplexing. The base station 104 may therefore request that multiple UEs 102 send an SRS during one SF, allowing the base station 104 to retrain its antenna beamforming for each UE 102 that the base station 104 will communicate with during that SF. In order to facilitate channel reciprocity, an SRS may be configured as a broadcast signal using the entire channel frequency bandwidth. The base station 104 may therefore inform each UE 102 to send its respective SRS during non-conflicting portions of the UL portion of the SF 300 and/or the UEs 102 may be instructed to use code division multiplexing or the like to avoid collision of their respective SRS at the base station 104.

In some embodiments, a request for an SRS from the base station 104 may provide further details to the UE 102 regarding the structure of the SRS that the UE 102 should use and the manner of transmission of the SRS from the UE 102. For example, the request may instruct the UE 102 to use a specific length of SRS to account for channel conditions, as described further below with respect to FIG. 7. The request may also (or alternatively) instruct the UE 102 to use a specific sub-band for its UL communication. The request may further (or alternatively) specify which physical resources the UE 102 is to use during the data upload in order to multiplex with other UEs 102 in the same SF. The request may also (or alternatively) specify whether a UE 102 having multiple antennas should send its UL data simultaneously from multiple antennas or multiplex its antennas.

Referring now to FIG. 6, there is shown an illustration of a SF 600 used by a UE 102 with two antennas sending multiplexed SRS, one from each antenna in adjacent blocks of time within the UL portion of the SF 600. The base station 104 may send information regarding the structure and manner of sending of the SRS to wireless communication devices with scheduled or periodic SRS allocation, such as a UE 102.

In some embodiments, either the UE 102 or the base station 104 may determine a minimum processing gain (PG) needed to compensate for a poor channel, for example when a UE 102 is distant from a base station 104. The UE 102 may determine a minimum PG by monitoring how long it takes to successfully receive a SYNC signal from the base station 104. The base station 104 may determine a minimum PG by monitoring how long it takes to set up a random access channel (RACH) with the UE 102. In order to achieve the minimum PG, the length of the SRS may need to be scaled to exceed the portion of the SF allocated to UL.

In some embodiments, the base station 104 may be isolated from neighboring base stations 104. As a result, there may be little concern for interference with neighboring base stations 104 and/or other wireless communication devices. In this case, it is not critical to keep transmissions limited to one SF to avoid interference during a future SF.

Referring now to FIG. 7, there is illustrated a frame structure 700 wherein the SRS length is scaled to the length necessary to achieve the minimum PG. In the illustrated embodiment, the SRS extends across more than one entire SF. The base station 104 may schedule transmissions with multiple UEs 102 to allow them the time needed to complete communications at the minimum PG. Alternatively, the UEs 102 or the base station 104 may determine a period that would allow each UE 102 the time needed to complete communications to achieve a desired PG.

In some embodiments, the base station 104 may be embedded among neighboring base stations 104 such that the transmission ranges of the base stations 104 overlap. In this case, it may be desirable to keep transmissions limited to within one SF so as to avoid causing interference with neighboring communications.

Referring now to FIG. 8, a frame structure 800 is illustrated wherein an elongated SRS necessary to achieve a desired PG is divided among the allocated UL period of multiple SFs while maintaining phase continuity, so that the base station 104 may coherently combine the fragmented SRS portions together to form a single combined SRS. As can be seen, in contrast to the extended SRS in FIG. 7 that extends across more than one SF, in FIG. 8 the extended SRS is divided up so that no one SF is fully covered by an SRS.

In some embodiments, when the base station 104 determines that an elongated SRS is necessary as described above, the base station 104 may signal to the UE 102 during a DL portion of a SF to increase the length of its SRS. For example, the base station 104 may signal to the UE 102 to send an SRS of a particular length (e.g., length y) or greater. In other embodiments, when the UE 102 determines that a longer SRS is necessary as described above, the UE 102 may signal to the base station 104 to be prepared to receive a longer SRS, such as an SRS of a particular length (e.g., length y) or greater.

Figure 9:
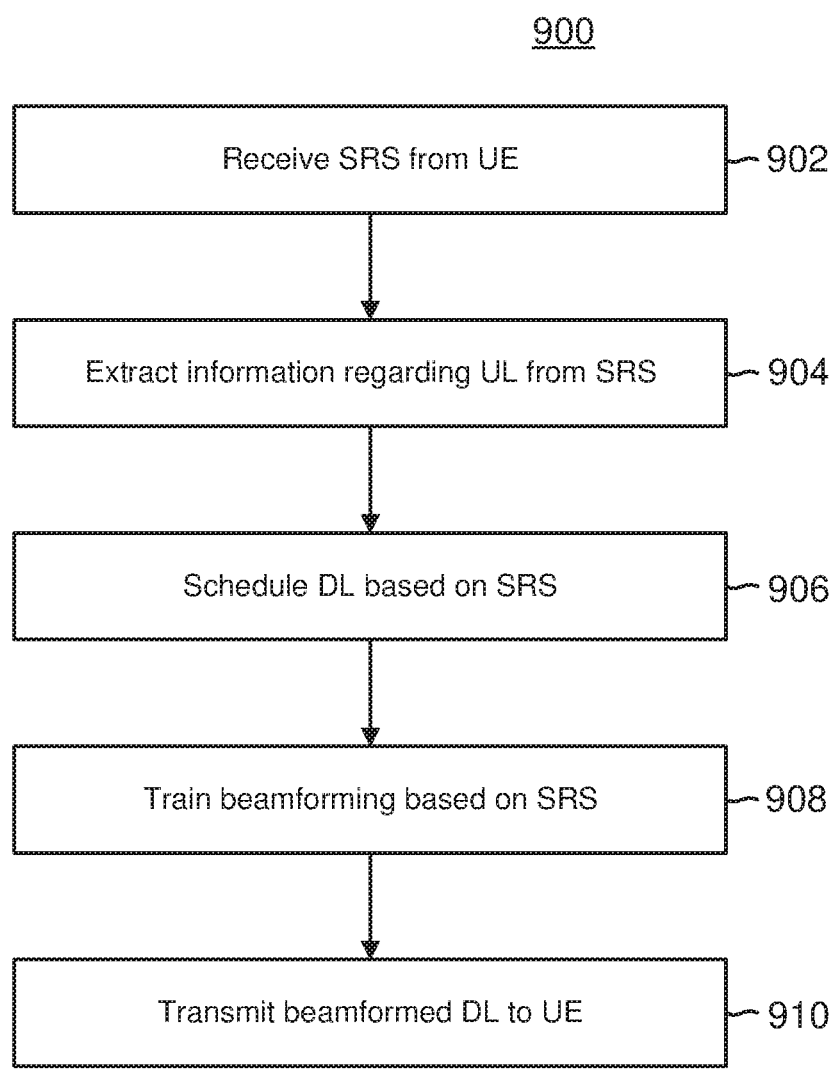
FIG. 9 is a flowchart illustrating an exemplary method 900 for using an uplink sounding reference signal for channel estimation in accordance with various aspects of the present disclosure.

FIG. 9 is a flowchart illustrating an exemplary method 900 for using an uplink sounding reference signal for channel estimation in accordance with various aspects of the present disclosure. The method 900 may be implemented in base station 104. The method 900 will be described with respect to a single base station 104 for simplicity of discussion, though it will be recognized that the aspects described herein may be applicable to any number of base stations 104. It is understood that additional method blocks can be provided before, during, and after the blocks of method 900, and that some of the blocks described can be replaced or eliminated for other embodiments of the method 900.

At block 902, a base station 104 receives an SRS from a UE 102 in an uplink communication, as described according to the various embodiments above. For example, the base station 104 may receive the SRS as part of an uplink portion of a subframe as illustrated in FIG. 3. According to the various embodiments of the present disclosure, the base station 102 may receive a single SRS from a single-antenna UE 102, multiple SRS corresponding to multiple antennas of a single UE 102, multiple SRS corresponding to single antennas of multiple UEs 102, and/or multiple SRS corresponding to multiple antennas of multiple UEs 102. Further, the SRS may be provided to the base station 104 according to non-orthogonal or orthogonal SRS, depending upon embodiment.

At block 904, the base station 104 extracts information about the uplink from the SRS received at block 902. This may include information useful in demodulating uplink data including in the uplink portion of the subframe, scheduling information, and channel information about the uplink channel.

At block 906, the base station 104 schedules the downlink communication (e.g., the downlink burst that is part of the downlink portion of a subframe), based on information extracted from the SRS at block 904.

At block 908, the base station 104 trains the beamforming for the one or more antennas of the base station 104 based on channel information extracted from the SRS received from the UE 102. Based on the SRS, the beamforming may be invariant to the number of antennas within the system, rendering embodiments of the present disclosure forward-compatible with future technologies that include more antennas (e.g., 16, 32, etc.) in MIMO arrays for example.

At block 910, as part of the same subframe, the base station 104 transmits a downlink burst including one or more reference signals (such as a UERS) as well as downlink data. With the beam forms of the antennas of the base station 104 trained based on the channel information derived from the uplink SRS, applied to the downlink by taking advantage of reciprocity during a short timeframe encapsulated by the subframe, the base station 104 is able to better improve its utilization of higher frequencies while still providing a substantially equivalent range that is possible with lower frequencies/evolution technologies (2G, 3G, 4G for example).

It is understood that method 900 may be implemented in program code stored on a computer readable medium. The program code may, for example, cause a processor to implement the blocks 902-910 upon reading the code from the computer readable medium. In some embodiments, the base station 104 of the present disclosure may include such a processor and such a computer readable medium with program code stored in it.

Figure 10:
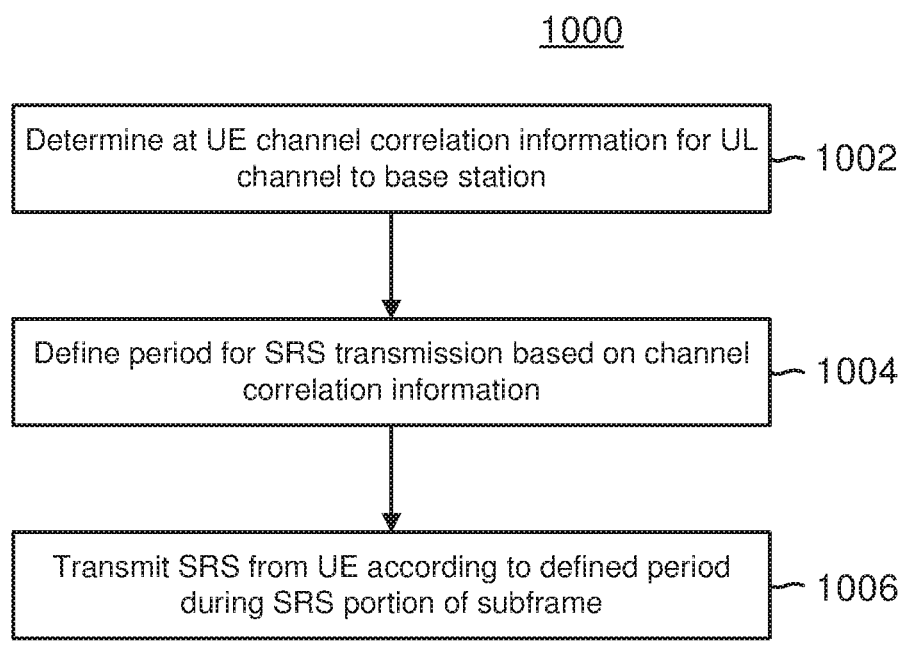
FIG. 10 illustrates an exemplary method for using periodic transmission of an SRS to perform channel estimation in accordance with various aspects of the present disclosure.

FIG. 10 illustrates an exemplary method 1000 for using periodic transmission of an SRS to perform channel estimation in accordance with various aspects of the present disclosure. Channel estimation via SRS, due to channel reciprocity, allows a base station 104 to retrain and/or update its beamforming. The method 1000 may be implemented in a UE 102. It is understood that additional method blocks can be provided before, during, and after the blocks of method 1000, and that some of the blocks described can be replaced or eliminated for other embodiments of the method 1000.

At block 1002, the UE 102 determines how quickly the UL channel between the UE 102 and the base station 104 is changing, and thus how quickly the channel is decorrelating.

At block 1004, the UE 102 uses the channel correlation information to determine a period after which the channel will be decorrelated. The UE 102 need only send an SRS to the base station 104 once every period in order to retrain and/or update the beamforming.

Therefore, at block 1006, the UE 102 transmits an SRS once every period to facilitate recorrelation by the base station 104. In every period, the SRS is transmitted during a designated portion of the UL portion of a subframe.

It is understood that method 1000 may be implemented in program code stored on a computer readable medium. The program code may, for example, cause a processor to implement the blocks 1002-1006 upon reading the code from the computer readable medium. In some embodiments, the UE 102 of the present disclosure may include such a processor and such a computer readable medium with program code stored in it.

Figure 11:
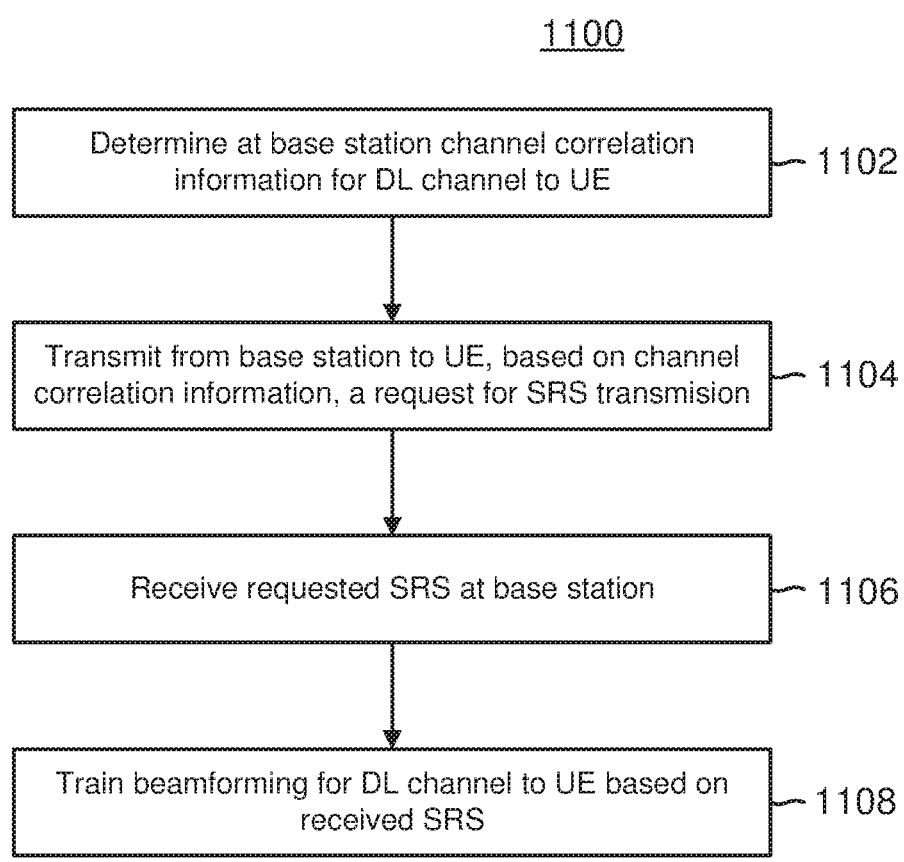
FIG. 11 illustrates an exemplary method for using on demand transmission of a sounding reference signal to perform channel estimation in accordance with various aspects of the present disclosure.

Referring now to FIG. 11, a flowchart is illustrated of an exemplary method 1100 for using on demand transmission of a sounding reference signal to perform channel estimation in accordance with various aspects of the present disclosure. Channel estimation via SRS, due to channel reciprocity, allows a base station 104 to retrain and/or update the beamforming. The method 1100 may be implemented in a base station 104. It is understood that additional method blocks can be provided before, during, and after the blocks of method 1100, and that some of the blocks described can be replaced or eliminated for other embodiments of the method 1100.

At block 1102, the base station 104 determines whether the DL channel between the base station 104 and the UE 102 is decorrelating.

At block 1104, the base station 104 uses the channel correlation information to determine whether it needs to retrain and/or update the beamforming. If so, the base station 104 sends a request for an SRS to UE 102.

At block 1106, the base station 104 receives the requested SRS and at block 1108, the base station 104 uses information obtained from the received SRS, either explicitly or implicitly, to retrain and/or update the beamforming to the UE 102.

It is understood that method 1100 may be implemented in program code stored on a computer readable medium. The program code may, for example, cause a processor to implement the blocks 1102-1108 upon reading the code from the computer readable medium. In some embodiments, the base station 104 of the present disclosure may include such a processor and such a computer readable medium with program code stored in it.

Figure 12:
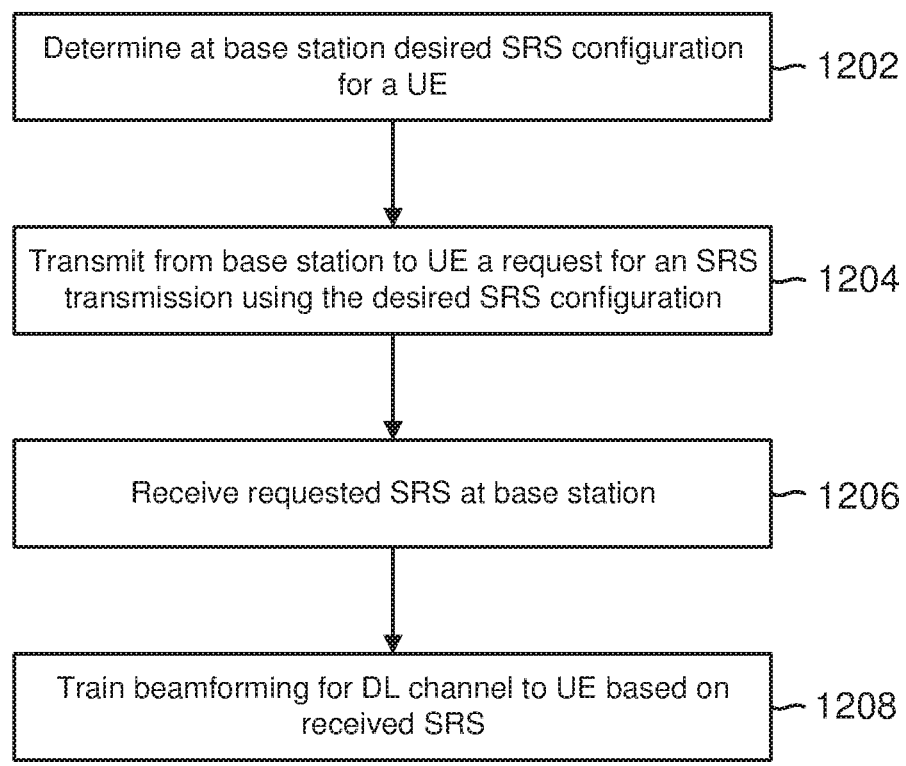
FIG. 12 illustrates an an exemplary embodiment of a method for using a sounding reference signal configured in a specifically desired manner for channel estimation in accordance with various aspects of the present disclosure.

Referring now to FIG. 12, there is illustrated an exemplary embodiment of a method 1200 for using a sounding reference signal configured in a specifically desired manner for channel estimation in accordance with various aspects of the present disclosure. The method 1200 may be implemented in a base station 104. It is understood that additional method blocks can be provided before, during, and after the blocks of method 1200, and that some of the blocks described can be replaced or eliminated for other embodiments of the method 1200.

At block 1202, the base station 104 determines a desired configuration for an and/or manner of sending an SRS which it will request from a UE 102. The base station 104 may request that the UE 102 use a particular length SRS. The base station 104 may alternatively request that the UE 102 use a specific sub-band of the channel when sending its SRS. The base station 104 may alternatively request that the UE 102 use a specific configuration of physical resources when sending its SRS. The base station 104 may alternatively request that the UE 102 having multiple antennas send SRSs simultaneously from all antennas, or that it multiplex its SRSs from each antenna.

At block 1204, the base station 104 transmits to the UE 102 a request for SRS containing the desired configuration and/or manner of sending from block 1202. At block 1206, the base station 104 receives the requested SRS from the UE 102. At block 1208 the base station 104 trains its beamforming based on information obtained, either explicitly or implicitly, from the received SRS.

It is understood that method 1200 may be implemented in program code stored on a computer readable medium. The program code may, for example, cause a processor to implement the blocks 1202-1208 upon reading the code from the computer readable medium. In some embodiments, the UE 102 and base station 104 of the present disclosure may include such a processor and such a computer readable medium with program code stored in it.

Figure 13:
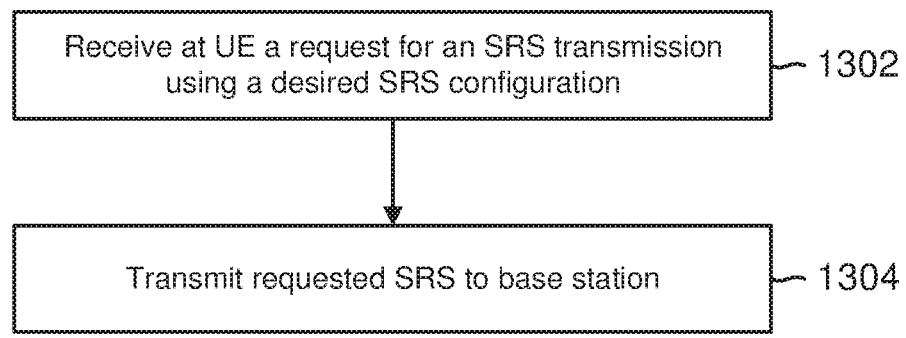
FIG. 13 illustrates an exemplary method for using a sounding reference signal configured in a specifically desired manner for channel estimation in accordance with various aspects of the present disclosure.

Referring now to FIG. 13, there is illustrated an exemplary method 1300 for using a sounding reference signal configured in a specifically desired manner for channel estimation in accordance with various aspects of the present disclosure. The method 1300 may be implemented in a UE 102. It is understood that additional method blocks can be provided before, during, and after the blocks of method 1300, and that some of the blocks described can be replaced or eliminated for other embodiments of the method 1300.

At block 1302, a UE 102 receives a request for an SRS from a base station 104. The request contains requests from the base station 104 that the SRS be configured and/or sent in a specific manner. The request may include that the UE 102 use a particular length SRS. The request may further include that the UE 102 use a specific sub-band of the channel when sending its SRS. The request may further include that the UE 102 use a specific configuration of physical resources when sending its SRS. The request may further include that a UE 102 having multiple antennas send SRSs simultaneously from all antennas, or that it multiplex its SRSs from each antenna. At block 1304 the SRS transmits an SRS conforming to the requested configuration and/or manner of sending.

It is understood that method 1300 may be implemented in program code stored on a computer readable medium. The program code may, for example, cause a processor to implement the blocks 1302 and 1304 upon reading the code from the computer readable medium. In some embodiments, the UE 102 of the present disclosure may include such a processor and such a computer readable medium with program code stored in it.

Figure 14:
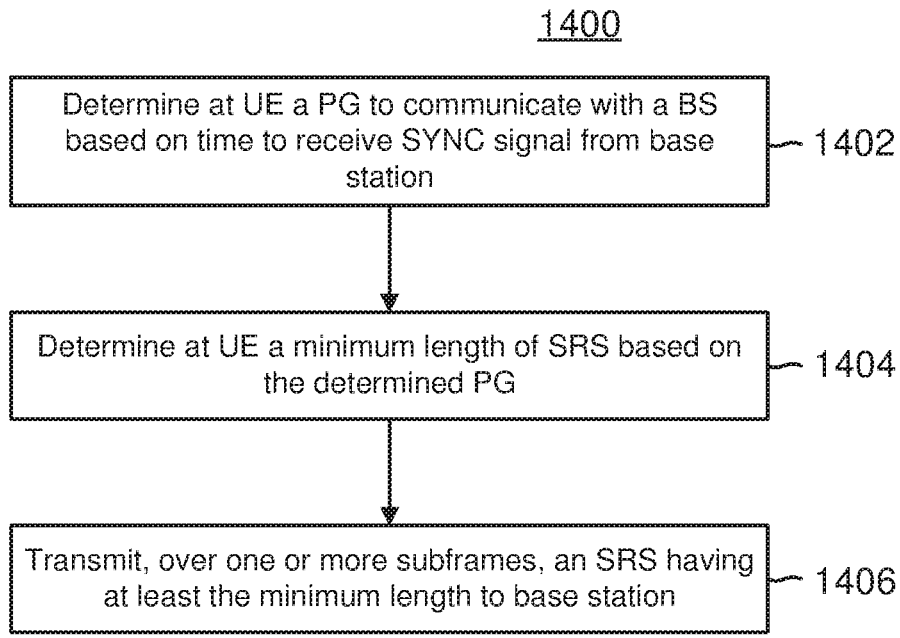
FIG. 14 illustrates an exemplary method for channel estimation under poor channel conditions.

Referring now to FIG. 14, there is illustrated an exemplary method 1400 for channel estimation under poor channel conditions. The method 1400 may be implemented in a UE 102. It is understood that additional method blocks can be provided before, during, and after the blocks of method 1400, and that some of the blocks described can be replaced or eliminated for other embodiments of the method 1400.

At block 1402, the UE 102 determines whether the channel conditions between the UE 102 and a base station 104 are poor. This may be determined, for instance, by monitoring the length of time it takes to receive a SYNC signal from the base station 104. The UE 102 may use this information to determine a minimum processing gain (PG) required to establish a useable channel with the base station 104. The UE 102 may increase PG by elongating the length of its SRS. At block 1404, the UE 102 determines, based on the minimum PG, a minimum length SRS to reach the minimum PG. At block 1406, the UE 102 transmits the elongated SRS to the base station 104. The elongated SRS may take up more than the allotted UL portion of a subframe, or even more than one entire subframe. In some embodiments, the UE 102 transmits the elongated SRS continuously over as many subframes as needed to reach the minimum PG. In other embodiments, the UE 102 transmits the elongated SRS in fragments, each fragment being transmitted only during an allotted UL portion of a subframe.

It is understood that method 1400 may be implemented in program code stored on a computer readable medium. The program code may, for example, cause a processor to implement the blocks 1402-1406 upon reading the code from the computer readable medium. In some embodiments, the UE 102 of the present disclosure may include such a processor and such a computer readable medium with program code stored in it.

Figure 15:
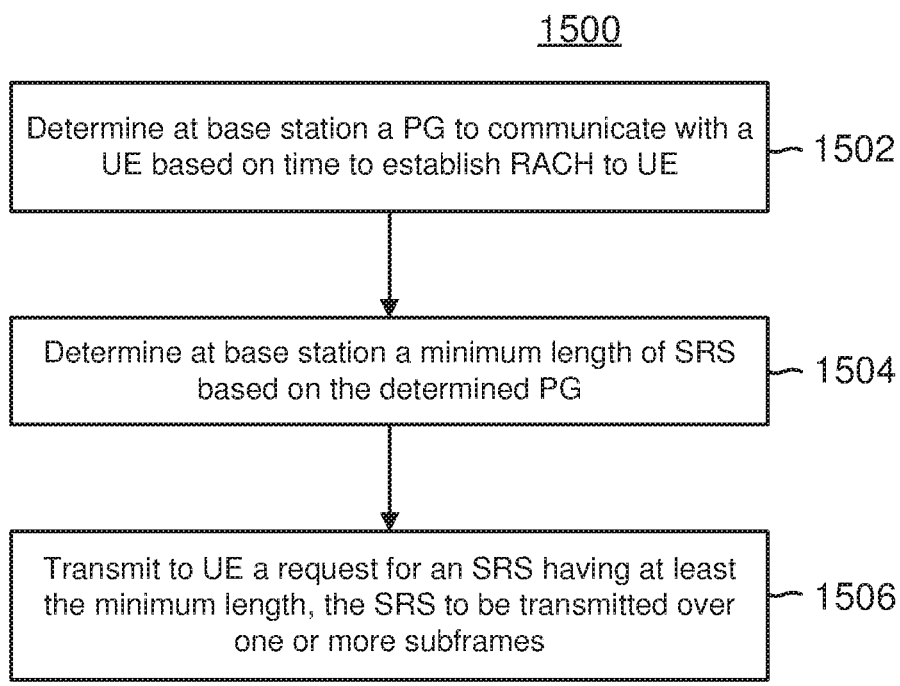
FIG. 15 illustrates an exemplary method for channel estimation under poor channel conditions.

Referring now to FIG. 15, there is illustrated an exemplary method 1500 for channel estimation under poor channel conditions. The method 1500 may be implemented in a base station 104. It is understood that additional method blocks can be provided before, during, and after the blocks of method 1500, and that some of the blocks described can be replaced or eliminated for other embodiments of the method 1500.

At block 1502, the base station 104 determines whether the channel conditions between the base station 104 and a UE 102 are poor. This may be determined, for instance, by monitoring the length of time it takes to establish a random access channel (RACH) with the UE 102. The base station 104 may use this information to determine a minimum processing gain (PG) required to establish a useable channel with the UE 102. PG may be increased by elongating the length of its SRS sent from the UE 102.

At block 1504, the base station 104 determines, based on the minimum PG, a minimum length SRS to reach the minimum PG.

At block 1506, the base station 104 transmits a request for an elongated SRS to the UE 102. The elongated SRS may take up more than the allotted UL portion of a subframe, or even more than one entire subframe. In some embodiments, the base station 104 receives the elongated SRS continuously over as many subframes as needed to reach the minimum PG. In other embodiments, the base station 104 receives the elongated SRS in fragments, each fragment being transmitted only during an allotted UL portion of a subframe.

It is understood that method 1500 may be implemented in program code stored on a computer readable medium. The program code may, for example, cause a processor to implement the blocks 1502-1506 upon reading the code from the computer readable medium. In some embodiments, the base station 104 of the present disclosure may include such a processor and such a computer readable medium with program code stored in it.

Figure 16:
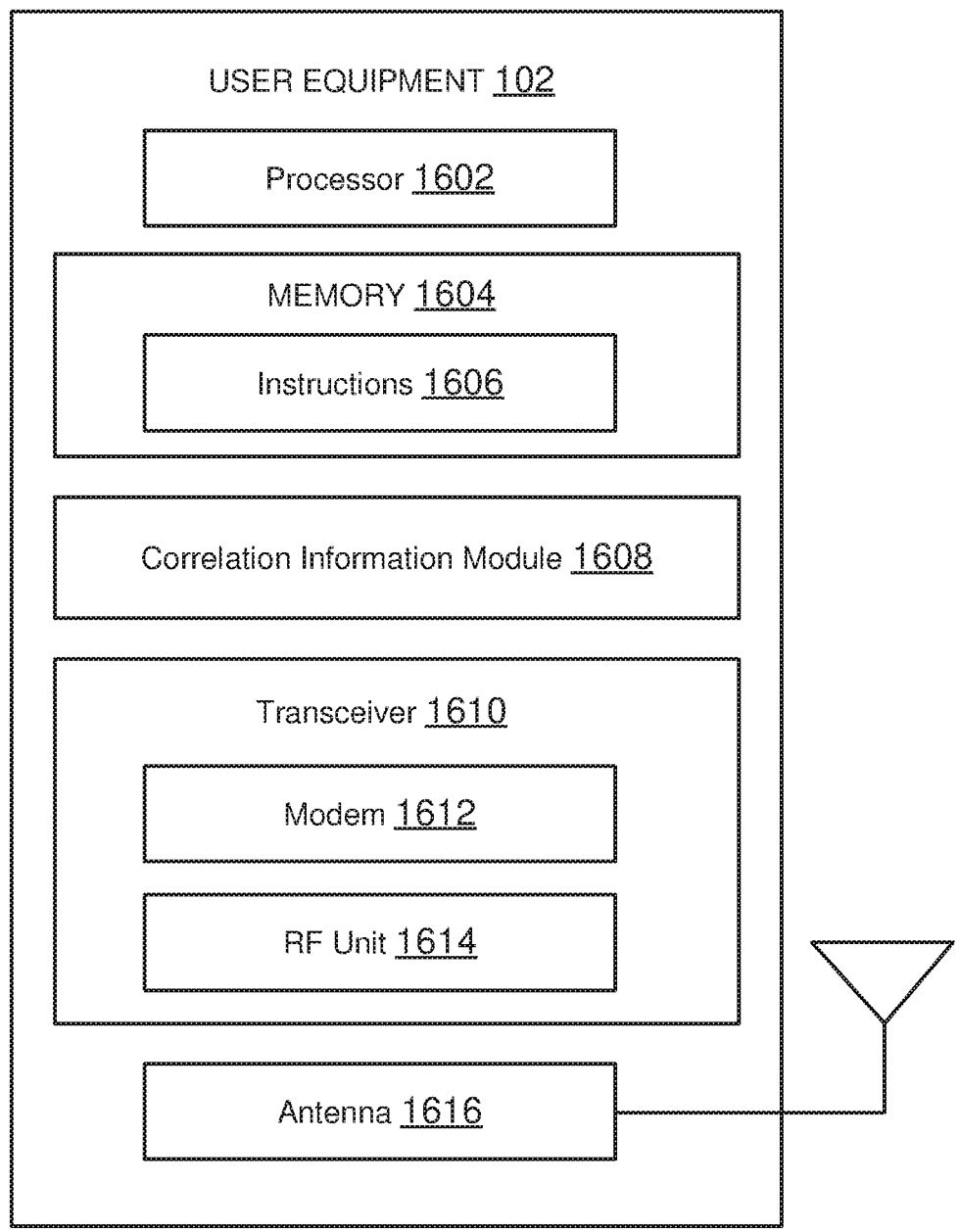
FIG. 16 is a block diagram of an exemplary wireless communication device, such as a user equipment, according to embodiments of the present disclosure.

FIG. 16 is a block diagram of an exemplary wireless communication device 1600 according to embodiments of the present disclosure. The wireless communication device 1600 may be a base UE 102 as discussed above. As shown, the UE 102 may include a processor 1602, a memory 1604, a correlation information module 1608, a transceiver 1610 (including a modem 1612 and RF unit 1614), and an antenna 1616. These elements may be in direct or indirect communication with each other, for example via one or more buses.

The processor 1602 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to UEs 102 introduced above with respect to FIG. 1 and discussed in more detail above. In particular, the processor 1602 may be utilized in combination with the other components of the UE 102, including correlation information module 1608, to perform the various functions associated with determining whether an update of SRS periodicity is necessary and what the required minimum length of the SRS is as described in greater detail above. The processor 1602 may also be implemented as a combination of computing devices, e.g., a combination of a DSP and a microprocessor, a plurality of microprocessors, one or more microprocessors in conjunction with a DSP core, or any other such configuration.

The memory 1604 may include a cache memory (e.g., a cache memory of the processor 1602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1604 includes a non-transitory computer-readable medium. The memory 1604 may store instructions 1606. The instructions 1606 may include instructions that, when executed by the processor 1602, cause the processor 1602 to perform the operations described herein with reference to the UEs 102 in connection with embodiments of the present disclosure. Instructions 1606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The correlation information module 1608 may be used for various aspects of the present disclosure. For example, the correlation information module 1608 may determine the rate of decorrelation of the channel due to, for example, movement of the UE 102. The correlation information module 1608 may then use the determined rate of decorrelation to determine a period after which the channel will be decorrelated, and to schedule SRS transmission at the determined period. In another embodiment, the correlation information module 1608 may interpret a request for an SRS from a base station 104 and configure an SRS accordingly. In another embodiment, the correlation information module 1608 may determine a processing gain necessary to communicate with a base station 104. The correlation information module 1608 may then use the processing gain information to determine a minimum length of SRS necessary, and configure an SRS accordingly for transmission to the base station 104

As shown, the transceiver 1610 may include the modem subsystem 1612 and the radio frequency (RF) unit 1614. The transceiver 1610 can be configured to communicate bi-directionally with other devices, such as base stations 104. The modem subsystem 1612 may be configured to modulate and/or encode the data from the correlation information module 1608 and other aspects of the UE 102, such as processor 1602 and/or memory 1604, according to a modulation and coding scheme (MCS), e.g., a low-density parity check (LDPC) coding scheme, a turbo coding scheme, a convolutional coding scheme, etc. The RF unit 1614 may be configured to process (e.g., perform analog to digital conversion or digital to analog conversion, etc.) modulated/encoded data from the modem subsystem 1612 (on outbound transmissions) or of transmissions originating from another source such as a UE 102 or a base station 104. Although shown as integrated together in transceiver 1610, the modem subsystem 1612 and the RF unit 1614 may be separate devices that are coupled together at the UE 102 to enable the UE 102 to communicate with other devices.

The RF unit 1614 may provide the modulated and/or processed data, e.g. data packets (or, more generally, data messages that may contain one or more data packets and other information), to the antenna 1616 for transmission to one or more other devices. This may include, for example, transmission of an SRS according to embodiments of the present disclosure. The antenna 1616 may further receive data messages transmitted from other devices and provide the received data messages for processing and/or demodulation at the transceiver 1610. Although FIG. 16 illustrates antenna 1616 as a single antenna, antenna 1616 may include multiple antennas of similar or different designs in order to sustain multiple transmission links.

Figure 17:
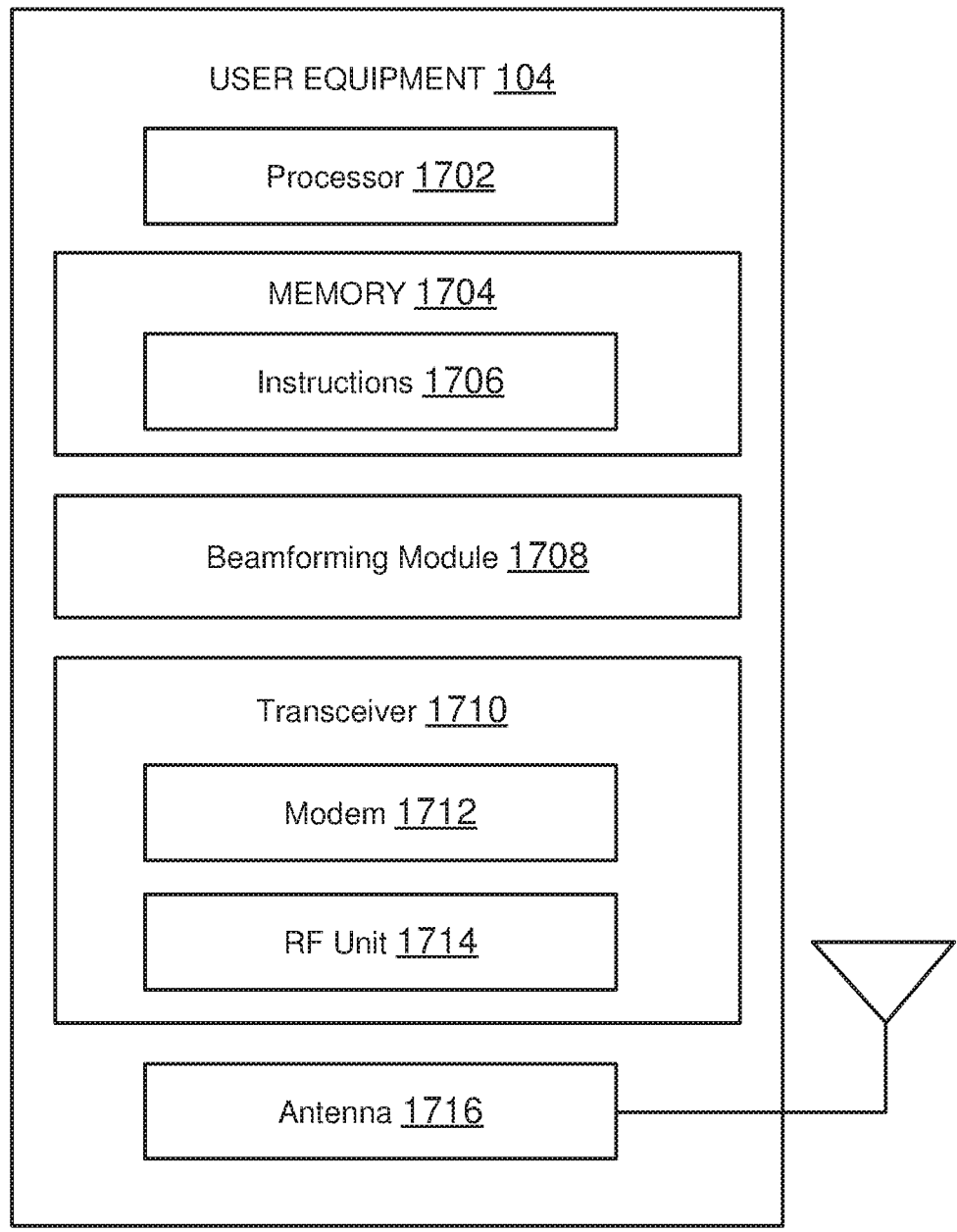
FIG. 17 is a block diagram of an exemplary wireless communication device, such as a base station, according to embodiments of the present disclosure.

FIG. 17 illustrates a block diagram of an exemplary base station 104 according to the present disclosure. The base station 104 may include a processor 1702, a memory 1704, a beamforming module 1708, a transceiver 1710 (including a modem 1712 and RF unit 1714), and an antenna 1716. These elements may be in direct or indirect communication with each other, for example via one or more buses.

The processor 1702 may have various features as a specific-type processor. For example, these may include a CPU, a DSP, an ASIC, a controller, a FPGA device, another hardware device, a firmware device, or any combination thereof configured to perform the operations described herein with reference to the base stations 104 introduced in FIG. 1 above. The processor 1702 may also be implemented as a combination of computing devices, e.g., a combination of a DSP and a microprocessor, a plurality of microprocessors, one or more microprocessors in conjunction with a DSP core, or any other such configuration.

The memory 1704 may include a cache memory (e.g., a cache memory of the processor 1702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 1704 may include a non-transitory computer-readable medium. The memory 1704 may store instructions 1706. The instructions 1706 may include instructions that, when executed by the processor 1702, cause the processor 1702 to perform operations described herein with reference to a base station 104 in connection with embodiments of the present disclosure. Instructions 1706 may also be referred to as code, which may be interpreted broadly to include any type of computer-readable statement(s) as discussed above with respect to FIG. 2.

The beamforming module 1708 may be used for various aspects of the present disclosure. For example, the beamforming module 1708 may extract information from an SRS received from a UE 102 and train beamforming at each antenna 1716 based on the extracted information. In another embodiment, the beamforming module 1708 may determine correlation information for the DL channel to a UE 102 and transmit a request for an SRS to the UE 102 based on the correlation information. In another embodiment, the beamforming module 1708 may determine a processing gain necessary to communicate with a UE 102. The beamforming module 1708 may then use the processing gain information to determine a minimum length of SRS necessary, and transmit a request for the minimum length SRS to the UE 102.

As shown, the transceiver 1710 may include the modem subsystem 1712 and the radio frequency (RF) unit 1714. The transceiver 1710 can be configured to communicate bi-directionally with other devices, such as UE 102 and/or another core network element. The modem subsystem 1712 may be configured to modulate and/or encode data according to a MCS, e.g., a LDPC coding scheme, a turbo coding scheme, a convolutional coding scheme, etc. The RF unit 1714 may be configured to process (e.g., perform analog to digital conversion or digital to analog conversion, etc.) modulated/encoded data from the modem subsystem 1712 (on outbound transmissions) or of transmissions originating from another source such as a UE 102. Although shown as integrated together in transceiver 1710, the modem subsystem 1712 and the RF unit 1714 may be separate devices that are coupled together at the base station 104 to enable the base station 104 to communicate with other devices.

The RF unit 1714 may provide the modulated and/or processed data, e.g. data packets (or, more generally, data messages that may contain one or more data packets and other information), to the antenna 1716 for transmission to one or more other devices. This may include, for example, transmission of information to complete attachment to a network and communication with a camped UE 102 according to embodiments of the present disclosure. The antenna 1716 may further receive data messages transmitted from other devices and provide the received data messages for processing and/or demodulation at the transceiver 1710. Although FIG. 17 illustrates antenna 1716 as a single antenna, antenna 1716 may include multiple antennas of similar or different designs in order to sustain multiple transmission links.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
including, by a base station, an elongated duration for a sounding reference signal (SRS) in configuration information, the elongated duration for an uplink SRS transmission including and extending beyond an allotted uplink period of a first subframe;
transmitting, by the base station to a user equipment (UE), a request for the SRS, wherein the request for the SRS includes the configuration information; and
receiving, by the base station from the UE, the SRS with the elongated duration as a continuous SRS burst.

2. The method of claim 1, wherein the configuration information includes at least one SRS parameter selected from the group consisting of: a burst length of the SRS, a sub-band on which the SRS is to be transmitted, a burst multiplexing configuration of the SRS, burst resources to be used for the SRS, and dimensionality of the SRS.

3. The method of claim 1, wherein the elongated duration extends at least to the end of the first subframe.

4. The method of claim 3, wherein the elongated duration extends beyond the end of the first subframe into a second subframe adjacent the first subframe.

5. The method of claim 1, wherein the elongated duration is based on a first channel quality at a first time, and wherein the method further comprises:
including, by the base station at a second different time, a second different elongated duration for a different uplink SRS transmission in second configuration information, the second elongated duration based on a second different channel quality at the second time;
transmitting, by the base station to the UE, a request for a second SRS, wherein the request for the second SRS includes the second configuration information; and
receiving, by the base station from the UE, the second SRS based on the second elongated duration.

6. The method of claim 5, wherein:
the transmitting the request for the second SRS includes transmitting, by the base station to the UE, the request for the second SRS to increase an SRS duration of the second SRS to be of at least the second elongated duration, and
the receiving the second SRS includes receiving, by the base station from the UE, the second SRS with the increased SRS duration equal to or greater than the second elongated duration.

7. A method of wireless communication, comprising:
including, by a base station, an elongated duration for a sounding reference signal (SRS) in configuration information, the elongated duration for an uplink SRS transmission greater than a duration of an allotted uplink period of a first subframe;
transmitting, by the base station to a user equipment (UE), a request for the SRS, wherein the request for the SRS includes the configuration information; and
receiving, by the base station from the UE, the SRS with the elongated duration as a plurality of SRS fragments.

8. The method of claim 7, further comprising:
combining, by the base station, the plurality of SRS fragments to form a single combined elongated SRS.

9. The method of claim 7, wherein the receiving includes:
receiving, by the base station from the UE, the plurality of SRS fragments across multiple subframes including the first subframe.

10. The method of claim 9, wherein the receiving includes:
receiving, by the base station from the UE, each of the plurality of SRS fragments during an allotted UL portion of one of the multiple subframes.

11. A method of wireless communication, comprising:
receiving, by a user equipment (UE) from a base station, a request for a sounding reference signal (SRS), wherein the request for the SRS includes configuration information about the SRS, and wherein the configuration information includes an elongated duration for the SRS including and extending beyond an allotted uplink period of a first subframe; and
transmitting, by the UE to the base station, the SRS with the elongated duration as a continuous SRS burst.

12. The method of claim 11, wherein the configuration information includes at least one SRS parameter selected from the group consisting of: a burst length of the SRS, a sub-band on which the SRS is to be transmitted, a burst multiplexing configuration of the SRS, burst resources to be used for the SRS, and dimensionality of the SRS.

13. The method of claim 11, wherein the elongated duration extends at least to the end of the first subframe.

14. The method of claim 13, wherein the elongated duration extends beyond the end of the first subframe into a second subframe adjacent the first subframe.

15. The method of claim 11, wherein the elongated duration is based on a first channel quality at a first time, and wherein the method further comprises:
receiving, by the UE from the base station, a request for a second SRS, wherein the request for the second SRS includes a second different elongated duration for the second SRS, the second elongated duration based on a second different channel quality at a second different time; and
transmitting, by the UE to the base station, the second SRS based on the second elongated duration.

16. The method of claim 15, wherein:
the receiving the request for the second SRS includes receiving, by the UE from the base station, the request for the second SRS to increase an SRS duration of the second SRS to be of at least the second elongated duration, and the transmitting the second SRS includes transmitting, by the UE to the base station, the second SRS with the increased SRS duration equal to or greater than the second elongated duration.

17. A method of wireless communication, comprising:
receiving, by a user equipment (UE) from a base station, a request for a sounding reference signal (SRS), wherein the request for the SRS includes configuration information about the SRS, and wherein the configuration information includes an elongated duration for an uplink SRS transmission greater than a duration of a first subframe; and
transmitting, by the UE to the base station, the SRS with the elongated duration as a plurality of SRS fragments.

18. The method of claim 17, further comprising:
dividing, by the UE, the SRS into the plurality of SRS fragments, wherein the plurality of SRS fragments maintains a phase continuity.

19. The method of claim 17, wherein the transmitting includes:
transmitting, by the UE to the base station, the plurality of SRS fragments across multiple subframes including the first subframe.

20. The method of claim 19, wherein the transmitting includes:
transmitting, by the UE to the base station, each of the plurality of SRS fragments during an allotted UL portion of one of the multiple subframes.

21. A base station comprising:
a processor configured to include an elongated duration for a sounding reference signal (SRS) in configuration information, the elongated duration for an uplink SRS transmission including and extending beyond an allotted uplink period of a first subframe; and
a transceiver configured to:
transmit, to a user equipment (UE), a request for the SRS, wherein the request for the SRS includes the configuration information; and
receive, from the UE, the SRS with the elongated duration as a continuous SRS burst.

22. The base station of claim 21, wherein the configuration information includes at least one SRS parameter selected from the group consisting of: a burst length of the SRS, a sub-band on which the SRS is to be transmitted, a burst multiplexing configuration of the SRS, burst resources to be used for the SRS, and dimensionality of the SRS.

23. The base station of claim 21, wherein the elongated duration extends at least to the end of the first subframe.

24. The base station of claim 23, wherein the elongated duration extends beyond the end of the first subframe into a second subframe adjacent the first subframe.

25. The base station of claim 21, wherein:
the elongated duration is based on a first channel quality at a first time,
the processor is further configured to:
include, at a second different time, a second different elongated duration for a different SRS transmission in second configuration information, the second elongated duration based on a second different channel quality at the second time,
the transceiver is further configured to:
transmit, to the UE, a request for a second SRS, wherein the request for the second SRS includes the second configuration information; and
receive, from the UE, the second SRS based on the second elongated duration.

26. The base station of claim 25, wherein the transceiver is further configured to:
transmit, to the UE, the request for the second SRS to increase an SRS duration of the second SRS to be of at least the second elongated, and
receive, from the UE, the second SRS with the increased SRS duration equal to or greater than the second elongated duration.

27. A user equipment (UE) comprising:
a transceiver configured to:
receive, from a base station, a request for a sounding reference signal (SRS), wherein the request for the SRS includes configuration information about the SRS, and wherein the configuration information includes an elongated duration for the SRS including and extending beyond an allotted uplink period of a first subframe; and
transmit, to the base station, the SRS with the elongated duration as a continuous SRS burst.

28. The UE of claim 27, wherein the configuration information includes at least one SRS parameter selected from the group consisting of: a burst length of the SRS, a sub-band on which the SRS is to be transmitted, a burst multiplexing configuration of the SRS, burst resources to be used for the SRS, and dimensionality of the SRS.

29. The UE of claim 27, wherein the elongated duration extends at least to the end of the first subframe.

30. The UE of claim 29, wherein the elongated duration extends beyond the end of the first subframe into a second subframe adjacent the first subframe.

31. The UE of claim 27, wherein the elongated duration is associated with a first channel quality at a first time, and wherein the transceiver is further configured to:
receive, from the base station, a request for a second SRS, wherein the request for the second SRS includes a second different elongated duration for the second SRS, and wherein the second elongated duration is based on a second different channel quality at a second different time; and
transmit, to the base station, the second SRS based on the second elongated duration.

32. The UE of claim 31, wherein the transceiver is further configured to:
receive, from the base station, the request for the second SRS to increase an SRS duration of the second SRS to be of at least the second elongated duration or greater, and
transmit, to the base station, the second SRS with the increased SRS duration equal to or greater than the second elongated duration.

* * * * *